United States Patent
Peczalski et al.

(10) Patent No.: US 8,368,551 B2
(45) Date of Patent: Feb. 5, 2013

(54) SCANNER FOR VIBRATION MAPPING

(75) Inventors: Andy Peczalski, Eden Prarie, MN (US); Gary Richard O'Brien, Jr., Riverview, MI (US); Steve D. Huseth, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 444 days.

(21) Appl. No.: 12/690,605

(22) Filed: Jan. 20, 2010

(65) Prior Publication Data

US 2011/0175746 A1    Jul. 21, 2011

(51) Int. Cl.
*G08B 21/00* (2006.01)
*G01S 13/00* (2006.01)

(52) U.S. Cl. ..... 340/683; 340/669; 340/682; 340/856.4; 342/189

(58) Field of Classification Search ............ 340/682, 340/683, 679, 856.4, 554, 669; 342/189; 73/570
See application file for complete search history.

(56) References Cited

U.S. PATENT DOCUMENTS

| | | | | |
|---|---|---|---|---|
| 5,443,354 | A | * | 8/1995 | Stone et al. .............. 414/729 |
| 7,225,108 | B2 | * | 5/2007 | Clarke et al. ............. 702/183 |
| 7,324,046 | B1 | * | 1/2008 | Wu ............................. 342/359 |
| 7,397,421 | B2 | * | 7/2008 | Smith ......................... 342/192 |
| 2005/0265124 | A1 | | 12/2005 | Smith | |

FOREIGN PATENT DOCUMENTS

EP          1065483 A1 *   1/2001

\* cited by examiner

*Primary Examiner* — Daniel Wu
*Assistant Examiner* — Mancil Littlejohn
(74) *Attorney, Agent, or Firm* — Schwegman, Lundberg & Woessner, P.A.

(57) ABSTRACT

A method of detecting motion in components that form part of a structure. The method includes flooding a first component with transmitted radio frequency signals and receiving reflected radio frequency signals from the first component with an antenna. The method further includes generating a first set of intermediate frequency signals based on differences between the transmitted radio frequency signals and the reflected radio frequency signals and measuring the first set of intermediate frequency signals. The method further includes flooding a second component with transmitted radio frequency signals and receiving reflected radio frequency signals from the second component with an antenna. The method further includes generating a second set of intermediate frequency signals based on differences between the transmitted radio frequency signals and the additional reflected radio frequency signals and measuring the second set of intermediate frequency.

14 Claims, 3 Drawing Sheets

SCANNER FOR VIBRATION MAPPING

BACKGROUND

The size, type and location of motions within structures (e.g., operating machinery) may provide an indication as to the relative health of the structure and may be used for predictive maintenance of the structure. One technique for analyzing moving components involves sensing motion (i.e., displacement, vibration and/or acceleration) of one or more of the components on the structures.

Many different types of instruments and systems have been developed for both monitoring and nondestructively testing structures, materials, devices and machines used for manufacturing processes. As examples, nondestructive testing is done on moving parts within machines that are used in refineries, power generators, aircraft, oil platforms, paper mills, and structures (bridges, cranes, etc.) in order to monitor the condition of those items.

Sensors have also been used for quality control in manufacturing operations and in research applications involving moving composite structures (e.g., those machines as fiberglass, reinforced plastics and advanced aerospace materials). In addition, sensors have been used as an effective indirect method for monitoring tool condition in machining operations.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

Figure 1:
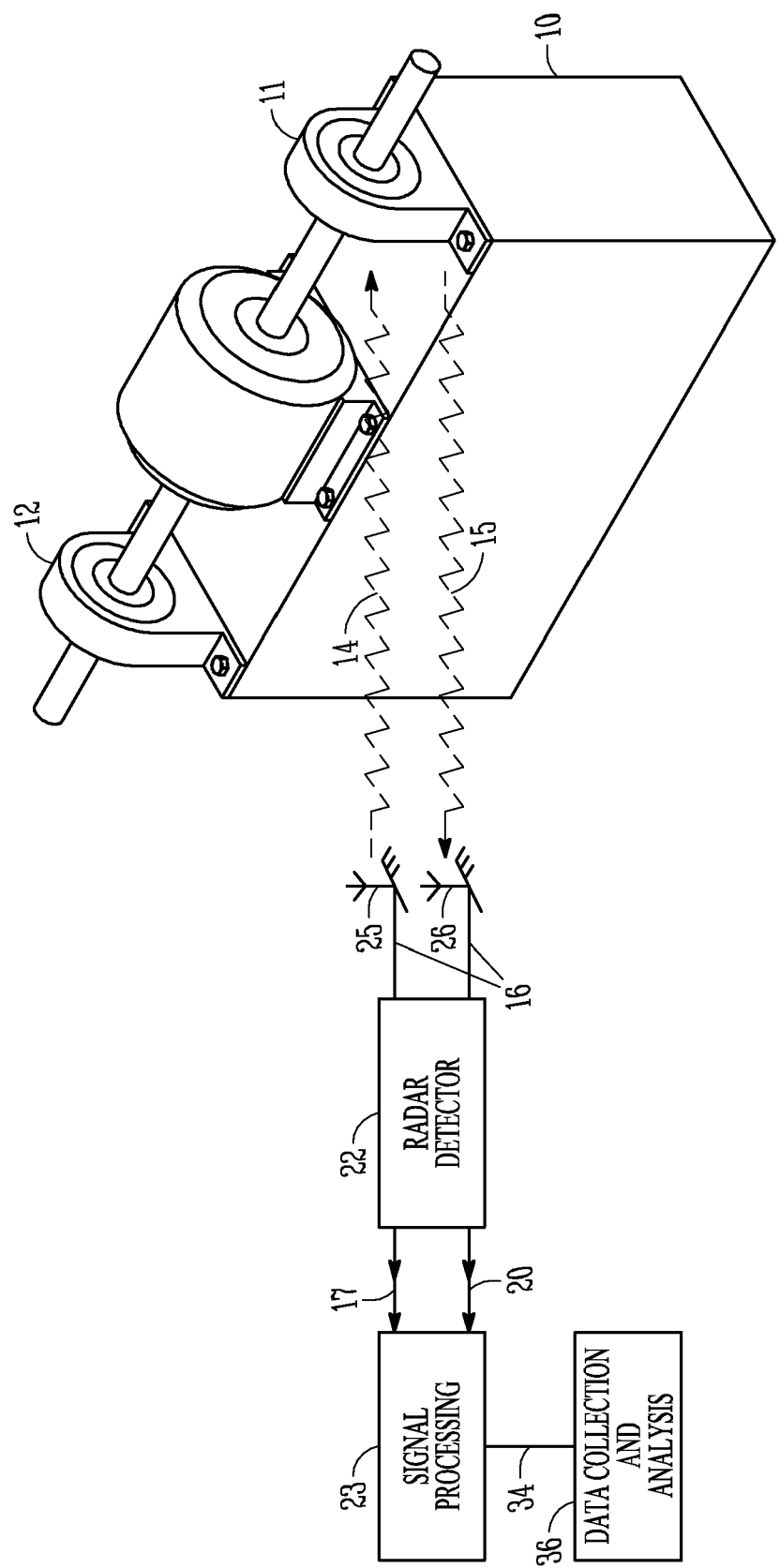
FIG. 1 illustrates an example arrangement of items that may be used in a method of detecting motion in a first component that forms part of a structure.
Figure 2:
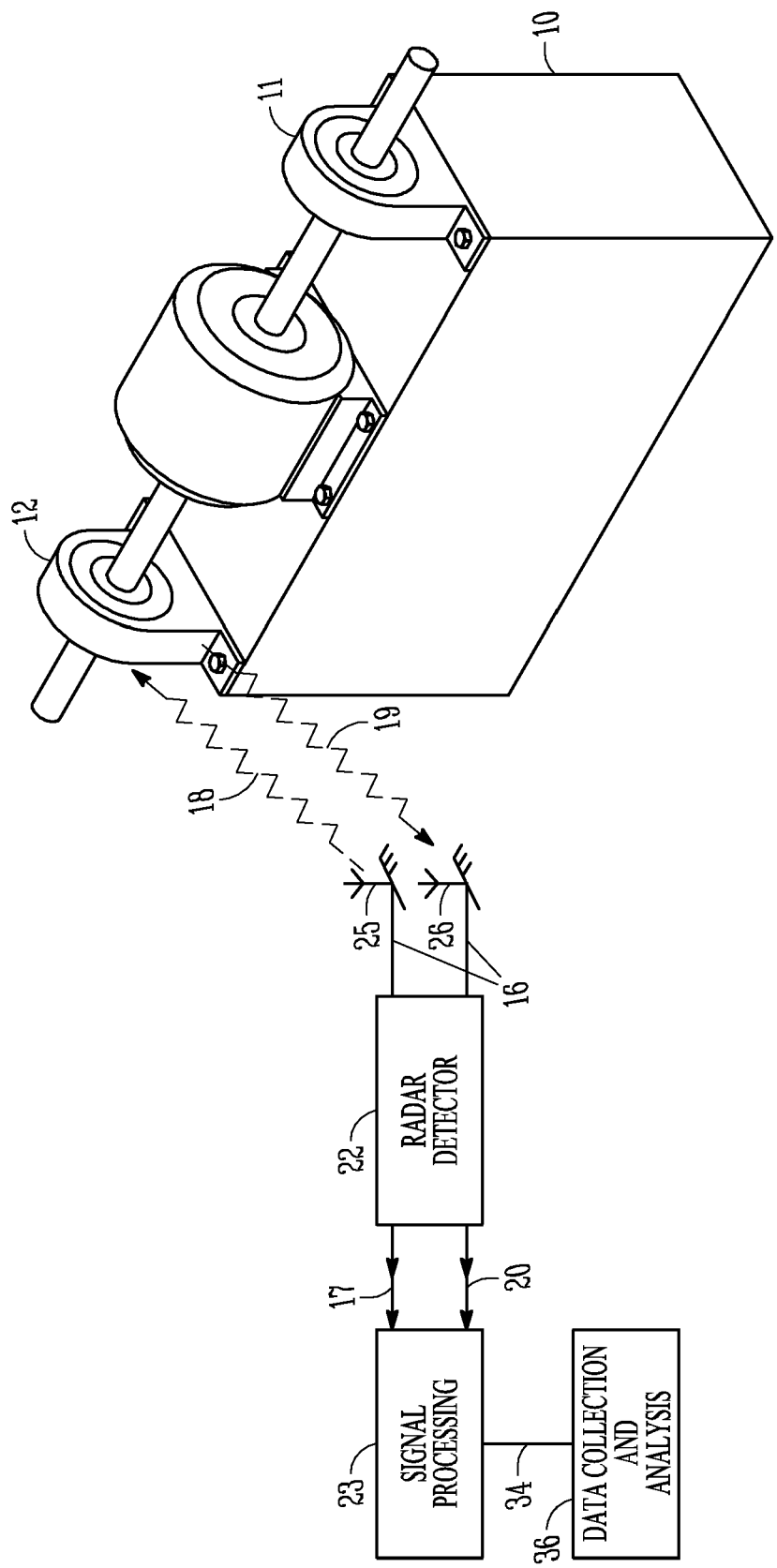
FIG. 2 illustrates the example arrangement of items shown in FIG. 1 where the method detects motion in a second component that forms part of the structure.

An example arrangement of items that may be used in a method of detecting motion in first and second components 11, 12 that form part of a structure 10 is described herein with reference to FIGS. 1-2. The method includes flooding (illuminating) the first component 11 with transmitted radio frequency signals 14 and receiving reflected radio frequency signals 15 from the first component 11 with an antenna 16 (see FIG. 1). The method further includes generating a first set of intermediate frequency signals 17 based on differences between the transmitted radio frequency signals 15 and the reflected radio frequency signals 16 and measuring the first set of intermediate frequency signals 17 (see FIG. 2).

The method further includes flooding the second component 12 with transmitted radio frequency signals 18 and receiving reflected radio frequency signals 19 from the second component 12 with the antenna 16. In some embodiments, the transmitted radio frequency signals are narrow enough (e.g. 8 degree field of view) such that at 1 foot distance) other components are not illuminated at the same time. The method further includes generating a second set of intermediate frequency signals 20 based on differences between the transmitted radio frequency signals 18 and the reflected radio frequency signals 19 and measuring the second set of intermediate frequency signals 20. It should be noted that radio frequency signals as used herein refers to variety of different types of signals (e.g., microwave radar signals).

In some embodiments, (i) the transmitted radio frequency signals 14, 18 may be supplied by a Doppler radar detector 22; (ii) the reflected radio frequency signals 15, 19 may be received the Doppler radar detector 22; and/or (iii) the antenna 16 may be part of the Doppler radar detector 22. The first and second set of intermediate signals 17, 20 signals may be analyzed to provide information about the motion of the first and second components 11, 12 relative to the structure 10. As an example, a regression relationship may be established between first and second component 11, 12 motion and the amplitude or frequency of the detected radio frequency reflections 15, 19. Using the established regression relationship movement of the first and second components 11, 12 can be projected.

Several characteristics make a microwave Doppler radar detector 22 attractive for detecting motion. The Doppler radar detector 22 may be relatively inexpensive when compared to other monitoring equipment. No contact is necessary between the Doppler radar detector 22 and the components to be monitored. In addition, the signal processing methods for Doppler radar signals are relatively simple.

In some embodiments, the Doppler Radar detector 22 may be built from a linear array (e.g., 8) of Doppler sensors each fed by separate horn antenna with narrow beam width (e.g. 10 degrees). Other embodiments may utilize an electronically scanned phase array antenna. Signals from individual sensors may be Fourier transformed and displayed as a 2-dimensional map on the screen of a device (e.g., a computer monitor).

The method may further include processing the first set of intermediate signals 17 to isolate signals associated with motion of the first component 11 (e.g., with a filter 23) and filtering the second set of intermediate signals 20 to isolate signals associated with motion of the second component 12 (e.g., with filter 23).

The first set of intermediate signals 17 is the difference between the transmitted radio frequency signals 14 and the reflected radio frequency signals 15 and the second set of intermediate signals 20 is the difference between the transmitted radio frequency signals 18 and the reflected radio frequency signals 19. The filter 23 may filter out lower frequency signals in the first and second set of intermediate signals 17, 20 to produce the filtered intermediate signals 38, 39.

In one example embodiment, the filter 23 removes frequencies less than 1 kHz. The filter 23 may also amplify certain signals corresponding to certain desired motion detecting characteristics. In addition, when sending filtered intermediate signals 38, 39 to a computer (one preferred embodiment of data collection and analysis) for subsequent digital processing, the bypass filter 23 may also remove very high frequencies necessary to prevent aliasing. It should be noted that some or all of the filters 23 may be low pass, high pass and notch types as well as fast Fourier transforms that divide a signal in small intervals around particular frequencies. As used herein, filtering also refers to all signal processing or signal conditioning functions/operations.

In some embodiments, flooding a first component 11 with transmitted radio frequency signals 14 and flooding a second component 12 with transmitted radio frequency signals 18 may each include transmitting the radio frequency signals 14, 18 with a transmitting portion 25 of the antenna 16. In addition, receiving reflected radio frequency signals 15 from the first component 11 with an antenna 16 and receiving reflected radio frequency signals 19 from the second component 12 with an antenna 16 may each include receiving the reflected radio frequency signals 15, 19 with a receiving portion 26 of the antenna 16. Although FIGS. 1-2 show antenna 16 as being formed of a transmitting portion 25 and a receiving portion 26, it should be noted that the antenna 16 may be formed of a single portion that transmits and receives signals.

Depending on the application where the method is utilized, measuring the first set of intermediate frequency signals 17 will include determining motion of the first component 11 based on the first set of intermediate signals 17 and measuring the second set of intermediate frequency signals 20 will include determining motion of the second component 12 based on the second set of intermediate signals 20.

In some embodiments, determining motion of the first component 11 based on the on the first set of intermediate signals 17 may include determining displacement of the first component 11 relative to the structure 10, and determining motion of the second component 12 based on the on the second set of intermediate signals 20 may include determining displacement of the second component 12 relative to the structure 10. It should be noted that in other embodiments, different types of types of motion may be determined for the first and second components 11 relative to the structure 10. As examples, the vibration, acceleration, displacement and velocity may be determined for the first and second components 11 relative to the structure 10.

Figure 3A:
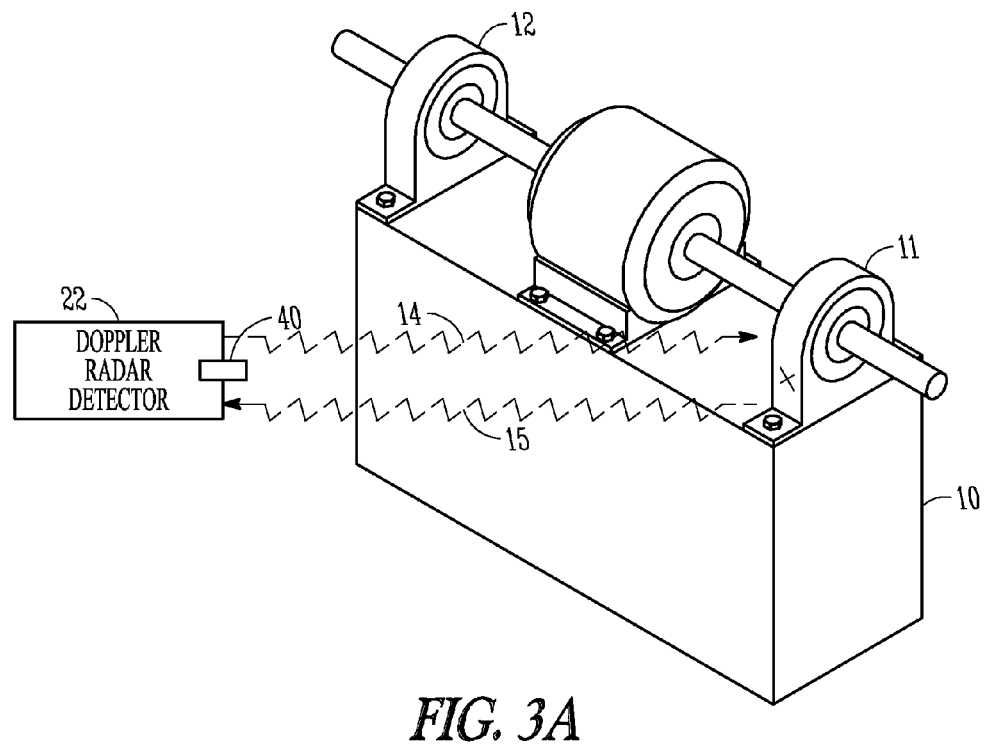
FIG. 3A shows an example embodiment where flooding a first component with transmitted radio frequency signals includes placing an indicator on the first component that identifies where the transmitted radio frequency signals are directed.
Figure 3B:
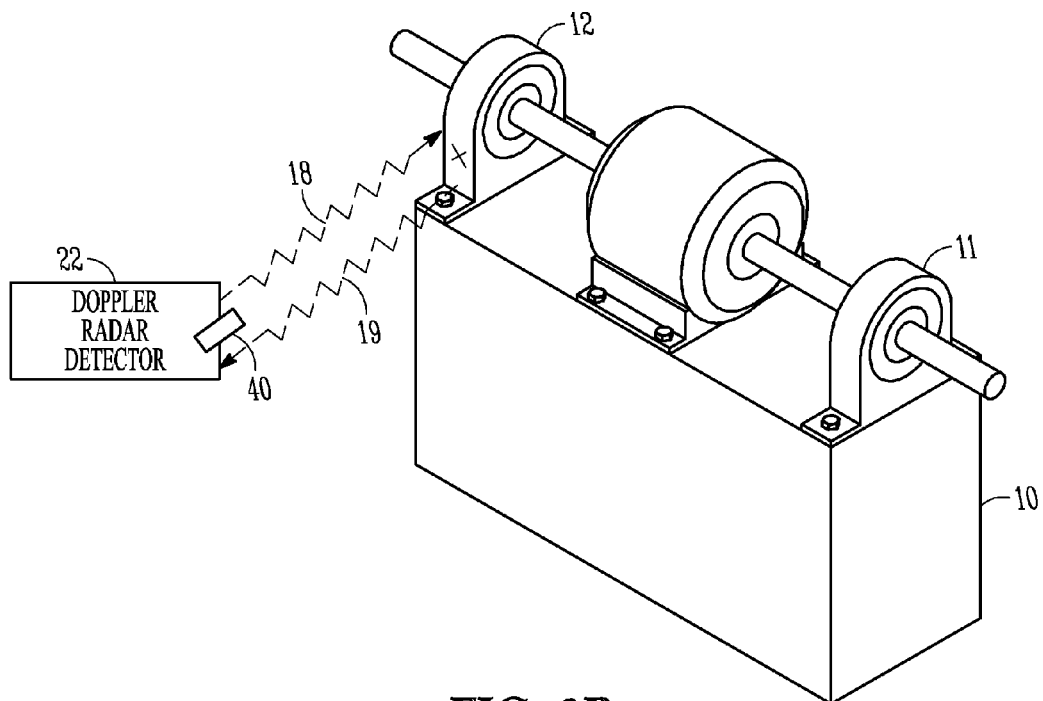
FIG. 3B shows an example embodiment where flooding a second component with transmitted radio frequency signals includes placing an indicator on the second component that identifies where the transmitted radio frequency signals are directed.

FIG. 3A shows an example embodiment where flooding a first component 11 with transmitted radio frequency signals 14 includes placing an indicator 30 on the first component 11 that identifies where the transmitted radio frequency signals 14 are directed. FIG. 3B shows an example embodiment where flooding a second component 12 with transmitted radio frequency signals 18 includes placing an indicator 30 on the second component 12 that identifies where the transmitted radio frequency signals 18 are directed.

In the example embodiment illustrated in FIGS. 3A and 3B, placing an indicator 30 on the first component 11 that identifies where the transmitted radio frequency signals 14 are directed includes projecting a beam of light 31 onto the first component 11. In addition, placing an indicator 30 on the second component 12 that identifies where the transmitted radio frequency signals 18 are directed includes projecting a beam of light 31 onto the second component 12. The beam of light may be projected onto the first and second components 11, 12 using an LED. Other example sources for the beam of light 31 include a laser pointer constructed with red LED. It should be noted that projecting a beam of light onto the second component may include aligning a light emitting device (e.g., an LED) relative to the Doppler radar detector 22. In some embodiments, aligning a light emitting device relative to the radar includes aligning a center of the first radio frequency signal with a center of the beam of light 31 and aligning a light emitting device relative to the radar includes aligning a center of the second radio frequency signal with a center of the beam of light 31.

In some embodiments, flooding a second component with transmitted radio frequency signals may include (i) manipulating by hand the antenna 16 (and/or the Doppler Radar detector 22) that supplies the radio frequency signals 18 in order to direct the radio frequency signals 18 at the second component 12; (ii) using a gimbal to maneuver the antenna 16 that supplies the radio frequency signals 18 in order to direct the radio frequency signals 18 at the second component 12; and/or (iii) using a phased array antenna to direct the radio frequency signals 18 at the second component 12.

The Doppler radar detector 22 can be used to remotely detect motion in a variety of components that form part of a variety of structures. The first and second intermediate signals will characteristically change as the motion of the first and second components 11, 12 changes relative to the structure 10.

As shown in FIGS. 3A and 3B, the method may further include (i) aligning a camera 40 relative to a radar detector 20 (ii) recording an image of the first component 11 using the camera 40; and (iii) recording an image of the second component 12 using the camera 40. Although camera 40 is shown slightly offset from first and second signals 14, 18 in FIGS. 3A and 3B, in some embodiments, aligning a camera 40 relative to a radar detector 22 may include aligning a center of the first radio frequency signal 14 with a center of the camera 40 aperture and aligning a center of the second radio frequency signal 18 with a center of the camera 40 aperture. Any images that are obtained by the camera 40 may be used to map the vibration amplitude and frequency or phase on the images of the structure 10.

In the illustrated example embodiment, the structure 10 is a machine that includes a motor, and the first and second components 11, 12 are load bearing members (e.g., bearings) that support a shaft which is driven by the motor. It should be noted that other types of structures and/or load bearing members may be monitored by the method. Some example structures include a wind turbine gearbox consists of many components each of them capable of showing different vibration that may be a signature of upcoming failure. Another example may be motor of a vehicle with many parts that may vibrate at different frequencies. Some example load bearing members include gears in a transmission box, suspension of a ground vehicle and a propeller shaft of a watercraft or a ship.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A method of detecting motion in components that form part of a structure, the method comprising:

flooding a first component with transmitted radio frequency signals;

receiving reflected radio frequency signals from the first component with an antenna;

generating a first set of intermediate frequency signals based on differences between the transmitted radio frequency signals and the reflected radio frequency signals;

measuring the first set of intermediate frequency signals;

flooding a second component with transmitted radio frequency signals;

receiving reflected radio frequency signals from the second component with an antenna;

generating a second set of intermediate frequency signals based on differences between the transmitted radio frequency signals and the additional reflected radio frequency signals;

measuring the second set of intermediate frequency signals, and wherein flooding a first component with transmitted radio frequency signals includes placing an indicator on the first component that identifies where the transmitted radio frequency signals are directed, and flooding a second component with transmitted radio frequency signals includes placing an indicator on the second component that identifies where the transmitted radio frequency signals are directed, and wherein placing an indicator on the first component that identifies where the transmitted radio frequency signals are directed includes projecting a beam of light onto the first component, and wherein placing an indicator on the second component that identifies where the transmitted radio frequency signals are directed includes projecting a beam of light onto the second component, and wherein projecting a beam of light onto the first component includes aligning a light emitting device relative to a radar that floods the first component with transmitted radio frequency signals, and projecting a beam of light onto the second component includes aligning a light emitting device relative to the radar that floods the second component with transmitted radio frequency signals.

2. The method of claim 1 further comprising:

filtering the first set of intermediate signals to isolate signals associated with motion of the first component; and filtering the second set of intermediate signals to isolate signals associated with motion of the second component.

3. The method of claim 1 wherein filtering the first set of intermediate signals to isolate signals associated with motion of the first component includes filtering the first set of intermediate signals received from the antenna with a filter, and wherein filtering the second set of intermediate signals to isolate signals associated with motion of the second component includes filtering the second set of intermediate signals received from the antenna with the filter.

4. The method of claim 1 wherein flooding a first component with transmitted radio frequency signals and flooding a second component with transmitted radio frequency signals each include transmitting the radio frequency signals with a transmitting portion of the antenna.

5. The method of claim 1 wherein receiving reflected radio frequency signals from the first component with an antenna and receiving reflected radio frequency signals from the second component with an antenna each include receiving the reflected radio frequency signals with a receiving portion of the antenna.

6. The method of claim 1 wherein measuring the first set of intermediate frequency signals includes determining motion of the first component based on the first set of intermediate signals and measuring the second set of intermediate frequency signals includes determining motion of the second component based on the second set of intermediate signals.

7. The method of claim 6 wherein determining motion of the first component based on the on the first set of intermediate signals includes determining displacement of the first component relative to the structure, and wherein determining motion of the second component based on the on the second set of intermediate signals includes determining displacement of the second component relative to the structure.

8. The method of claim 6 wherein determining motion of the first component based on the on the first set of intermediate signals includes determining vibration of the first component relative to the structure, and wherein determining motion of the second component based on the on the second set of intermediate signals includes determining vibration of the second component relative to the structure.

9. The method of claim 1 wherein aligning a light emitting device relative to the radar includes aligning a center of the first radio frequency signal with a center of the beam of light.

10. The method of claim 1 wherein flooding a second component with transmitted radio frequency signals includes manipulating by hand the antenna that supplies the radio frequency signals in order to direct the radio frequency signals at the second component.

11. The method of claim 1 wherein flooding a second component with transmitted radio frequency signals includes using a gimbal to maneuver the antenna that supplies the radio frequency signals in order to direct the radio frequency signals at the second component.

12. The method of claim 1 wherein flooding a second component with transmitted radio frequency signals includes using a phased array antenna to direct the radio frequency signals at the second component.

13. The method of claim 1 further comprising:

aligning a camera relative to a radar detector;

recording an image of the first component using the camera; and recording an image of the second component using the camera.

14. The method of claim 13 wherein aligning a camera relative to a radar detector includes aligning a center of the first radio frequency signal with a center of the camera aperture and aligning a center of the second radio frequency signal with a center of the camera aperture.

* * * * *